United States Patent

Graham, Jr.

[11] Patent Number: 5,527,172
[45] Date of Patent: Jun. 18, 1996

[54] APPARATUS FOR FORMING A FOAM PRODUCT

[75] Inventor: Joseph R. Graham, Jr., Richmond, Va.

[73] Assignee: Carpenter Co., Richmond, Va.

[21] Appl. No.: 228,389

[22] Filed: Apr. 15, 1994

[51] Int. Cl.[6] .................... B29C 44/20; B29C 39/14
[52] U.S. Cl. .................. 425/89; 425/224; 425/817 C
[58] Field of Search ............... 425/4 C, 89, 223, 425/224, 817 C

[56] References Cited

U.S. PATENT DOCUMENTS

| | | |
|---|---|---|
| 3,091,811 | 6/1963 | Hackert . |
| 3,123,856 | 3/1964 | Dye et al. . |
| 3,325,823 | 6/1967 | Boon . |
| 3,596,313 | 8/1971 | Darmochwal . |
| 3,719,734 | 3/1973 | Petzetakis . |
| 3,751,197 | 8/1973 | Petzetaris . |
| 3,768,937 | 10/1973 | Haga et al. . |
| 3,809,512 | 5/1974 | Blackwell et al. . |
| 3,812,227 | 5/1974 | Blackwell et al. . |
| 3,875,276 | 4/1975 | Haga et al. . |
| 3,942,925 | 3/1976 | Schmitzer et al. . |
| 3,965,228 | 6/1976 | Vreenegoor . |
| 4,005,958 | 2/1977 | Porter .................... 425/89 |
| 4,032,275 | 6/1977 | Schwab et al. .......... 425/89 |
| 4,056,595 | 11/1977 | Bokelmann . |
| 4,069,285 | 1/1978 | Morgan . |
| 4,074,960 | 2/1978 | Dockray et al. ........ 425/89 |
| 4,120,626 | 10/1978 | Keller .................... 425/89 |
| 4,128,611 | 12/1978 | Kolakowski et al. . |
| 4,154,562 | 5/1979 | Tabler .................... 425/89 |
| 4,165,955 | 8/1979 | Morgan . |
| 4,177,028 | 12/1979 | Dillard . |
| 4,255,370 | 5/1981 | Morgan . |
| 4,298,557 | 11/1981 | Bradford et al. . |
| 4,348,164 | 9/1982 | Fujii et al. . |
| 4,363,610 | 12/1982 | Murray et al. .......... 425/89 |
| 4,559,003 | 12/1985 | Poncet . |
| 4,567,008 | 1/1986 | Griffiths ................ 425/89 |
| 4,605,683 | 8/1986 | Broslaw . |

OTHER PUBLICATIONS

Unifoam Bulletin #20 "Further Development of the RS System" (no dated indicated).
Plastics Technology Article "Flat Top Bun Lines: Which System for You?" Dec. 1978.

Primary Examiner—James P. Mackey
Attorney, Agent, or Firm—Beveridge, DeGrandi, Weilacher & Young

[57] ABSTRACT

An apparatus and method for forming flat top foam buns or slabs which features positioning solely one sheet of film material to each side of a rising foam body. The single side sheet is positioned in contact with the rising foam on one side and in contact with a rigid side wall on the opposite side. Also, the single side sheet positioned between the rising foam and stationary side wall represents the only material between the side wall and foam material. The side film has a bottom edge which originates below a reference plane lying flush on the bottom supporting surface of the foam bun once it has reached an essentially full rise position. Preferably, bottom and side conveyors are provided near the full rise position of the foam material and the side film is redirected from an upwardly inclined edge arrangement to a horizontal edge arrangement. Unwind assemblies are provided exterior to each of the side walls and are positioned such that the side sheets extend from a downstream position toward an upstream edge of the side walls, are wrapped around the upstream edge of the side walls and then directed at an incline. Roller sets or the like are provided to maintain the preset incline or a plurality of inclines of the film despite the disruptive forces of the expanding foam. The inclined side sheets help offset the side height reducing shear forces which develop between the rising foam and noninclined side film or side wall.

36 Claims, 7 Drawing Sheets

APPARATUS FOR FORMING A FOAM PRODUCT

FIELD OF THE INVENTION

The present invention relates to a method and apparatus for forming a flat top foam slab or bun.

BACKGROUND OF THE INVENTION

There exists in the foam product industry a wide variety of methods and apparatus for forming foam slabstock products. Presently, the industry places heavy reliance on flat-top equipment systems and conversion kits. These flat-top equipment systems and conversion kits typically involve the general concept of applying rising foam to a fixed main trough with an open top and confining side walls. The main troughs often feature an initially sloped underlying support structure which abuts a downstream moving horizontal support surface such as a horizontal conveyor.

In these systems, sheets or films of paper or plastic are positioned between the rising foam and the bottom supporting surface and the side walls. The sheets (or films-the two words being used interchangeably herein) travel together with the foam material in the main trough to reduce frictional contact between the respective surfaces and to facilitate travel of the foam material within the main trough. The film material on the sides comes in contact with the interior surface of a side wall or a conveyor as the film material extends from a foam material introduction point until removal at a point downstream of the foam slabstock's full rise position. The films used in these systems typically have a bottom edge that extends horizontally and is aligned with the lower edge of the side walls.

Foaming material introduced into the main trough, however, expands vertically up and down while travelling downstream. The use of side films having horizontally extending upper and lower edges does not account for this vertical rise component in the foam, and therefor friction develops between the side film and the vertically rising foam. The shearing or rubbing of the rising foam material against the horizontally extending side sheets leads to the production of foam slabs with elongated rounded corners and a generally dome shaped upper surface.

The prior art includes a plurality of systems which have been designed in an effort to reduce this vertical rise friction so as to decrease the length of the rounded corners and to increase the height of the vertical sides. Reference is made to U.S. Pat. Nos. 3,091,811; 3,719,734; 3,751,197; 3,809,512; 3,812,227, 3,875,276 and 4,559,003 which are directed at foam slabstock production systems which, in addition to the usual main side films, incorporate additional secondary side films that are used in conjunction with the main side films. The secondary side films are either lifted up or drawn at an upward angle in an effort to lessen the friction on the vertically rising foam. These systems, which rely on secondary film systems, suffer from a variety of drawbacks such as friction development between the secondary and main films, a typically much more complex and difficult system to run, an increased chance for wrinkling to occur in the films, a tendency for side splits to develop and a high amount of waste film production.

Prior art systems also utilize fall plates as the underlying support surface. These fall plates have a downward slope that can be adjusted. In an effort to avoid rounded bun corners, attempts have been made to "hang" the foam on the side plastic by choosing steep inclines for the fall plates. However, these fall plate adjustments can lead to foam processing problems such as side splits.

U.S. Pat. No. 4,605,683 discloses a foam slabstock production system which features a protective film that is wrapped around an inclined conveyor system and then redirected near the downstream end of the conveyor system along the further downstream extending sidewalls of the main trough. The moving conveyor extends at an upward incline from a point near the foam introduction location and terminates near the foam's full rise position. The introduced foam material floats over a supporting liquid of higher specific gravity held in a tank while in an expanding state. The conveying means is preferably submerged in the supporting liquid, and a release agent and a solvent are added to the liquid in the tank to inhibit adherence of the polymer to the conveyor and the submerged protective film wrapped about the conveyor. This prior art system introduces the added complexity of having a conveyor running in an area where the foam material is highly turbulent and still in a highly fluid or liquid state. The system of U.S. Pat. No. 4,605,683 further requires the introduction of solvents and release agents to prevent adherence of foam to the submerged components and thus introduces added costs and further safety and waste disposal concerns. In addition, this prior system places moving parts in contact with the film which can make wrinkling control difficult.

SUMMARY OF THE INVENTION

The present invention is directed at a method and an apparatus for forming improved flat top foam slabs having more prime foam material available for forming prime foam products. The increase in the amount of available prime foam per given foam material input is brought about by a reduction in the curvature at the upper corners of the foam slabstock, and a corresponding increase in the height of the slab's sides. In achieving this increase, the present invention features a method and apparatus that places the upstream, bottom edge of side films or sheets significantly below a reference plane lying flush on the lower surface of the foam slab while the foam is in an essentially full rise state. The terms "upstream" and "downstream" when used in this disclosure are made in reference to the direction of foam material travel in the supporting and confining assembly.

Preferably, only a single sheet is positioned between the expanding foam material and an adjacent stationary side wall. The side sheets slope upwardly with the rising foam as they travel with the expanding foam and adjacent the rigid, non-moving sidewall. Accordingly, there is avoided the requirement for using secondary side sheets and the problems associated with placing a conveyor adjacent still liquid and violently expanding foam. The present invention further provides a system that prevents the film from becoming slack despite changes in the angle of incline for the side films. The present invention additionally provides a system that can be easily manipulated and adjusted to optimize production results for different foam materials introduced into the system and can be readily incorporated into other preexisting systems.

In providing the above-described advantages, the present invention features a foam slabstock production assembly which has a supporting and confining assembly that includes a bottom supporting surface and two stationary side walls. The bottom supporting surface preferably includes a plurality of fall plates that slope downwardly and are individually adjustable to provide for different angles of incline. The arrangement of the fall plates results in the rising foam's upper surface having a slight upward angle with respect to the horizontal bottom edge of the rigid sidewall as the foam travels between the introduction point and its full rise position. The slight incline in the upper surface of the foam material is present despite the downward incline of each or at least some of the fall plates as the foam expands vertically both up and down. The production assembly of the present invention also includes means for introducing foam material onto the bottom supporting surface of the supporting and confining assembly at an initial foam material introduction location. An introduction trough or an overhead adjustable nozzle are two possible means for introducing foam material onto the bottom supporting surface.

The supporting and confining assembly also preferably includes a moving bottom and moving side conveyors positioned downstream of each of the stationary side walls with the side conveyors having an interior contact surface essentially commensurate with the inner surface of a respective side wall.

The moving bottom and side conveyors have their upstream end positioned immediately after the downstream end of the bottom supporting surface. The bottom conveyor preferably is horizontally arranged. Also, the upstream end of the side and bottom conveyors is preferably positioned sufficiently downstream of the initial foam material introduction location such that the conveyors act upon a foam body which is essentially in or near a full rise state (e.g., the foam has reached 75% or more of its full rise height). The 75% value is set forth in light of the fact that some types of foam take much longer to reach a full rise state, and since different types of foam material are often introduced into one production assembly, not all foam material will be in a completely full rise state when first contacting the conveyors. A more preferred positioning of the upstream ends of the conveyors is within 90%–100% of the utilized foam's full rise height and even more preferably 95%–100%.

The bottom supporting surface portion extending between the foam introduction location and the bottom conveyor can include a plurality of adjustable (e.g., adjustable incline) fall plates with the most downstream fall plate having its downstream edge commensurate with the upstream edge of the bottom conveyor. A bottom film is provided in the usual manner and travels down the bottom supporting surface and along with the bottom conveyor.

On each of the side walls there is located a side film unwind assembly which includes a source of side film sheeting. The side film unwind assembly is dimensioned and arranged so as to position a lower edge of the side film below a reference plane lying flush on the foam supporting surface of the bottom conveyor. The side film unwind assembly is also dimensioned and arranged such that the side film extends from the unwind assembly and is wrapped about an upstream end or slotted opening of an adjacent side wall. After the side film is wrapped about the upstream end of the side wall, it is positioned between the interior surface of an adjacent side wall and the rising foam material. The side film also extends at an upward incline from its initial contact position with the front end of the side wall to a position preferably near or at where the side conveyors originate (which is also near where many types of foams reach a full rise state).

The single side film can slope in an uninterrupted fashion between these two locations. Hence, the slope of the side sheet, as it runs along the interior surface of the fixed side wall, is maintained constant while in contact with the foam material from the time of initial contact with the foam material until the time the foam material reaches the upstream end of the moving conveyor. The foam body expands outwardly so as to squeeze the side film against the side walls. Thus, the side film travels together with the foam body which is drawn downstream by the activity of the moving conveyors.

In an alternate embodiment, the side sheets are provided with sections arranged at different angles while extending between the initial contact point with the side wall and the downstream end of the side wall. For example, each side sheet can be extended at a first slope while passing through a first portion of the entire distance from the initial contact point to the end of the side wall. The side sheets can then be slightly redirected (e.g., 2° to 3°) at either a steeper or a less steep angle or maintained at the same angle in passing through a second portion of the aforementioned "entire distance". Similarly, the side sheet can be directed so as to either have the same slope, a lesser slope (including no slope or horizontal) or a greater slope in travelling over a third portion of the aforementioned "entire distance". While the side film travelling through the first portion will always have an upward slope, the side film travelling through the latter two portions may be provided with a lesser or greater slope or directed horizontally all depending upon the sheet's respective starting position on the side wall and the foaming characteristics of the foam material. Further, the number of side sheet portions redirected (e.g., 2 or more) can be varied to suit, for example, the length of the stationary side walls.

Means are provided for helping to maintain the side film's predetermined orientation (e.g., upward slope or slopes) in spite of any contrary influences exerted by the travelling foam body. Suitable means include roller sets that are vertically pre-positionable and angularly adjustable to set the desired side film incline (or non-inclined for the most downstream positioned roller sets). The chosen angle for each of the side films, adjacent the respective side walls, is designed to achieve the optimum height which the sides of the bun can achieve for the given conditions without causing adverse affects on the condition of the bun.

The side films pass between adjacent rollers within each roller set in passing from the lower upstream location to the higher downstream location. As noted, one or more of the roller sets are adjustable in vertical height (with respect to the above-noted reference plane) and in their angle of orientation so that the roller sets can be positioned for optimum performance with respect to the chosen incline or orientation for the side sheets. Preferably, the most upstream roller sets are vertically adjustable with motored means while the sets further downstream are manually adjustable. The angle orientation of the roller sets is preferably manually set in each case.

Also, in a preferred embodiment, three roller sets are supported on a common side wall and are spaced at intervals (e.g., equal intervals) between the foam introduction location and the upstream end of the moving conveyors. Each side wall is fixed in position while the foam material passes downstream to the moving conveyors, but the side walls can be adjusted inwardly or outwardly to allow for the production of different width foam slabs. The roller sets are supported on the upper edge or upper interior surface of the side walls or by external supports at a level above the anticipated top surface of the rising foam. The most downstream pair of roller sets is preferably positioned adjacent the upstream end of the side conveyor and are typically used to redirect the side film from an angled slope to a horizontal slope. Thus, the most downstream roller sets help the side sheets or films make the transition from an inclined side sheet to a side sheet with a horizontal upper and lower edge.

The side films' width is chosen so that the side film covers the width of the full rise foam plus an extra amount sufficient for engagement with the roller sets without disrupting the foam material. The roller sets are provided with a high friction surface (e.g., rubber) to help avoid angle changes in the sloping side sheets.

In the arrangement of the present invention, only the single side film or sheet extends between each side wall and the foam material introduced into the supporting and confining assembly. The single sheet therefore preferably contacts, on one side, the entire surface of the adjacent foam material and, on its other side, the interior surface of the sidewall. This avoids the problems of extra side film waste and the difficulties brought about by having both a main and a secondary side film positioned between the side wall and foam material (e.g., the smaller width side film sometimes pulls up on the foam too much and since the lower foam material is not drawn up by the side film, side splits tend to develop in the side of the foam body).

The side film passing along the interior of the sidewalls is inclined from its lower contact position with the front end of the side wall at an angle of just greater than 0° (e.g., 1° or 2°) up to about 15° with respect to the horizontal or the reference plane defined by the upper surface of the bottom conveyor. This range is particularly suited for use with fall plates which typically are positioned at a downward slope within a range of 8° to 22°. This initial slope of the side film can be maintained all the way to the end of the side wall or varied in sections as described above. In view of the at least initial incline of the single side sheet passing along the stationary side wall, the unwind assembly or side film introduction means of the present invention preferably includes an adjustable side film unwind assembly to provide smooth film travel, to avoid the formation of slackened areas in the inclined side sheet and to provide easy side film angle adjustments.

One side film unwind assembly is provided externally to the exterior side surface of each respective side wall. Each unwind assembly is preferably also positioned downstream of the front end of the adjacent, stationary side wall where the side film wraps about the wall (or a slot formed in the side wall for side film passage therethrough). Each side film unwind assembly comprises a side film roll support structure which is tiltable either upstream or downstream within a range of 0° to 15° or, more preferably, 0° to 10° with respect to the vertical.

In a preferred embodiment, the side film roll support structure is tilted such that the lower edge of the side film slopes upwardly from the roll until it contacts the front end of the side wall. Each side film is therefore first extended in an upstream direction adjacent the exterior of a side wall, wrapped about the end of the side wall (or a slot formed therein) and then redirected in a downstream direction between the foam material and interior surface of the side wall. A pair of long, vertical rollers positioned at the upstream end of the side wall or a smoothly contoured wrap about member can be used to provide a smooth transition as the film is redirected. The side sheet, after being wrapped about the upstream end of the side wall, is directed at an upward incline as it travels with the rising foam. The upward incline of the film on the inside surface is preferably equal to the upward incline of the film traveling upstream on the exterior of the side wall. The angle maintenance means or roller sets can be used to alter this equal angle arrangement, however.

In addition to being able to vary the angle to which the side film slopes from its source to the wrap around location, the side sheet roll can be varied in height with respect to the reference plane, (i.e. the plane lying flush on the bottom supporting surface underlying the foam when in a full rise position or when the foam reaches the moving conveyors). In this way, the location at which the lower edge of the side sheet contacts the front end of the side wall, prior to sloping upwardly along the interior of the side wall, can be easily adjusted to allow for a quick setting of the desired upward incline of the side film along the interior surface of the rigid, and non-moving side wall. Height adjustments can be achieved through use of, for example, a telescoping arrangement (e.g., hydraulic or screw threads) in a central shaft of the roll support structure or by other means such as height adjustable bearing supports or members to raise a frame structure supporting a film supply roll support structure. Preferably the lower edge of the film coming off of the roller in a non-tilt condition can be adjusted between slightly greater than 0 inches (e.g., 1 or 2 inches) below the reference plane to about 15 inches below the reference plane.

Each side film unwind assembly preferably includes a supporting framework which pivotably supports the side film roll support structure with securing means for holding a roll of side film. An angle adjustment assembly is provided for providing and setting a predetermined tilt in the side film roll support structure so as to correspondingly tilt a central axis of the side roll securement means from 0° to ±15° with the 0° reference being a location where the central axis of the roll securement means is transverse to the reference plane (e.g. vertical). Accordingly, the side film roll that is rotatably held by the roll securement means has a central axis or rotating axis which is commensurate with that of the side film roll securement means.

To help promote unwrinkled side film travel, an idler roller is spaced from the side roll securement means on the side film roll support structure. The side film extends from its roll source about the idler roller and into contact with the upstream end of the side wall.

The present invention also includes a method for producing foam slabstock which includes passing only a single sheet of film material along an interior surface of a fixed side wall of a foam material supporting and confining assembly. The passing of the single sheet of side film includes extending the film at an upward slope along the interior of each side wall from an angle greater than 0° to about 15° from an upstream contact position with the introduced foam toward a downstream contact position wherein the moving conveyors originate (which is preferably where the foam is nearly at or in a full rise state). The invention includes passing the side film at either a constant, essentially uninterrupted slope or a series of different slopes between these two points of reference. One method of the invention features passing the film at a fixed slope and in an uninterrupted fashion between an introduction location below the reference plane to the upstream end of a conveyor which is preferably near the full rise position for many foam materials considered for use in the production assembly. The side walls are fixed in position during passage of the foam thereby and each side conveyor has an inner surface essentially commensurate with the interior surface of the side wall.

An alternate method of the invention includes passing the side film off from its initial contact position at a first angle (e.g., 9°), passing the same sheet at a different angle (e.g., 11°) during a second section of the sidewall, at a third angle (2° to 3°) during a third section and then horizontally downstream.

The above noted angle or angles of upward incline can be determined by taking the angle formed between the lower edge of the side film and an intersecting plane lying flush on the bottom conveyor. The introduction or wrap around location of the film is horizontally spaced from the upstream end of the conveyor by about 15 to 40 feet. The different positioning of the side film's lower edge can be achieved by making vertical adjustments in either the support assembly for the film supply roll or by tilting the roll supports or both.

The method further includes introducing foam material into the supporting and confining assembly such that the foam material travels downstream from a foam introduction location to the side and bottom conveyors. The foam is preferably at or nearly at a full rise position upon reaching the side conveyors and bottom conveyors which preferably originate at a common downstream location. The method also includes running the side and bottom conveyors so as to draw foam material downstream and also to assist in drawing the side film pinched between the side conveyors and foam body. The method also includes directing and maintaining the side film traveling downstream at a predetermined slope or slopes with angle maintenance means such as one or more roller assemblies that contact the upper edge of the sloping side film.

The method also features passing the side film from a side film support roll which is positioned externally to the side wall. The side film is directed so as to extend from the supply roll at an upward slope into contact with an upstream wrap around edge or vertical roller set of a side wall of the supporting and confining assembly. Preferably, the central axis of the support roll is tilted downstream and is adjustable to different tilt orientations.

The film is then redirected about the upstream edge of the side wall and at an upward slope along the interior side surface of the fixed side wall. Preferably the side film contacts an elongated vertical roller or a curved contact surface as it is passed around the upstream wrap-around edge of the side wall.

BRIEF DESCRIPTION OF THE DRAWINGS

Particular features of the process, the product produced, and the apparatus for producing the product according to the present invention will be more clearly apparent from the following description of the preferred embodiments of the invention illustrated in the annexed drawings, wherein.

DETAILED DESCRIPTION OF THE PREFERRED EMBODIMENTS

Figure 1:
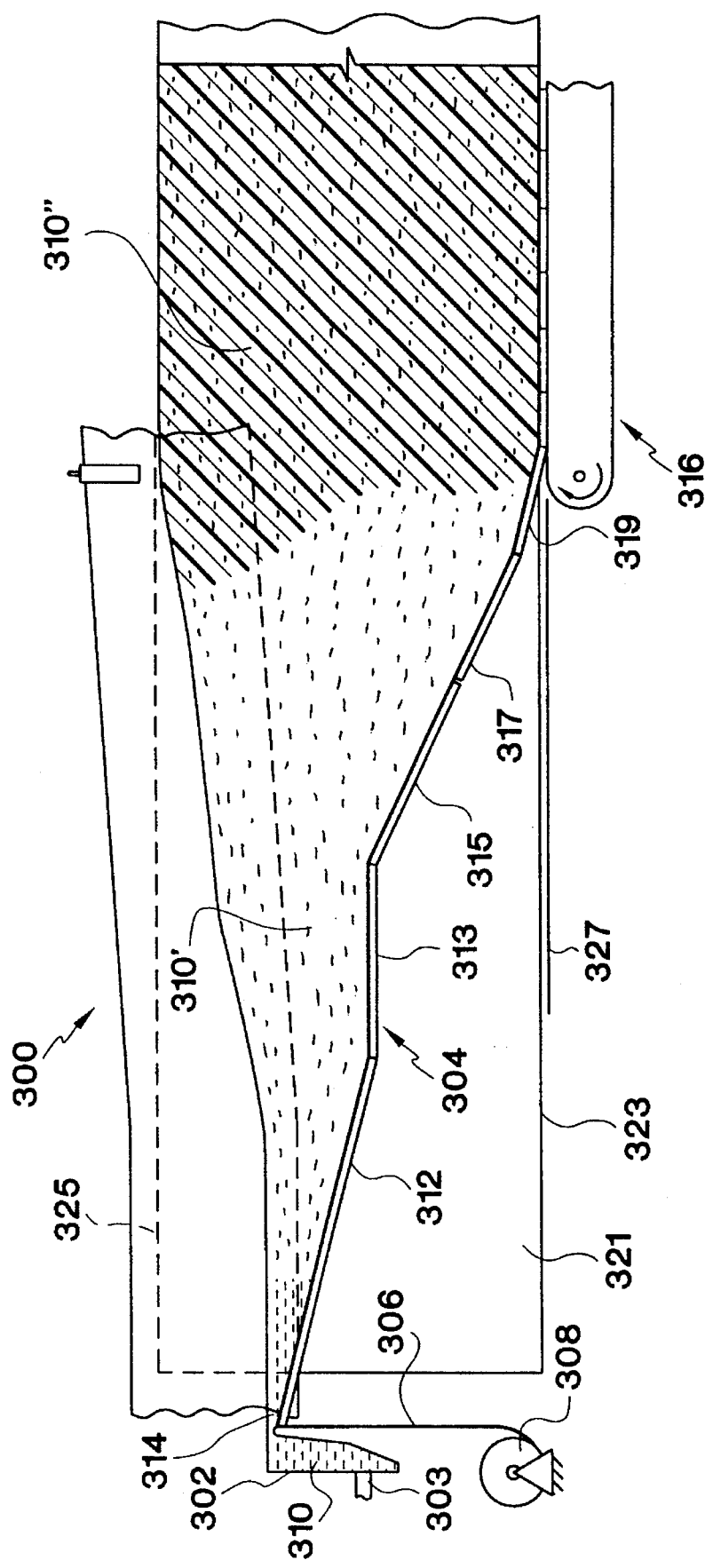
FIG. 1 shows a partially cutaway and somewhat schematic side elevational view of a foam slabstock production line previously relied upon in the industry (the sides of the main trough being removed to facilitate the description)

FIG. 1 provides a schematic illustration of a previously relied upon foam slabstock production assembly 300. In assembly 300, foam material 310 is pumped through inlet conduit 303 and into inlet trough 302 while in a liquid state. The liquid foam material 310 foams upwardly within trough 302, out of inlet trough 302 and onto supporting and confining assembly 304. As discussed in greater detail below, supporting and confining assembly 304 includes inclined fall plates, side walls and bottom and side conveyors. Bottom sheet or film 306 is supplied from supply roll 308 and extends through gap 314 into position between the vertically rising foam material 310' and fall plates 312, 313, 315, 317 and 319. The bottom sheet travels together with the foaming material traveling downstream in supporting and confining assembly 304 due to the influence of moving conveyors such as bottom conveyor 316. Trough 302 is provided with vertical adjustment means (not shown) which, in turn, lifts the upstream edge of plate 312 hinged thereto to a desired incline.

Horizontally orientated bottom conveyor 316 extends away from the downstream end of lower fall plate 319 and facilities the downstream movement of the foam material along the supporting and confining assembly 304. At the time foam material 310 contacts moving bottom conveyor 316, the foam material has passed from an originally liquid state (310), through a violent expansion state (310') and then into a full rise or nearly full rise (e.g., nearly completely solidified) state (310"). The fall plates are adjustable so as to provide different sloping surfaces to compensate for variances in the types of foam materials being used to achieve different foamslab products.

The supporting and confining assembly 304 includes side walls (not shown in FIG. 1) that extend vertically adjacent the exterior edges of the fall plates. Side conveyors (also not shown in FIG. 1) are positioned so as to have an upstream vertical front end commensurate with the upstream end of bottom conveyor 316. The side conveyors also have an interior surface which lies on essentially the same vertical plane defined by the interior surface of an adjacent side wall. Between each side wall and the adjacent exterior side surface of the moving foam material in the previously relied upon embodiment shown in FIG. 1, there is positioned two separate side films or sheets.

As shown in FIG. 1 a relatively wide, vertically oriented side sheet 321 contacts the adjacent side wall and, partially, the foam material. The relatively wide side sheet 321 has a bottom edge 323 and a top edge 325 and the edges extend horizontally at all times when in contact with the foam material. The bottom edge 323 of wide side sheet 321 extends essentially at the level defined by the upper surface of the bottom conveyor which is designated by reference plane 327 lying flush on the upper surface of conveyor 316. Upper edge 325 of wide sheet 321 extends a few inches above the full rise level of the foam material.

The foam material introduced onto the fall plates 310' expands in an upward vertical and a downward vertical manner as it travels along fall plates 312, 313, 315, 317 and 319. Due to the friction which develops between the foam material, the horizontally extending side sheets, and the adjacent side wall, the middle portion of the body of foam material expands upwardly to a greater height than the sides of the body of foam material. This results in the foam body having a relatively high dome for its top surface with the dome portion representing waste or scrap as the upper surface of a prime foam layer sliced from the slab is required in the industry to have a planar upper surface. In other words, the greater the amount of friction between the side wall (or side sheet) and the foam material, the lower the height of the sides of the foam slab and the greater the height of non-usable prime foam above the side's height. The high friction thus results in an elongated curved corner extending between the top edge of the slab's side and the intermediate area of the foam body.

FIG. 1 further illustrates the use of a second, relatively small width side sheet which is vertically oriented and travels between the larger width side film and the foam material. The second side sheet is angled upwardly in an effort to lessen the degree to which the friction of the side film/foam body interface prevents the side of the foam body from fully expanding. In other words, the upwardly sloped secondary side sheet on each side helps pull up the foam body's sides to offset the pulling down effect caused by the frictional forces that develop between the side horizontal sheets and the foam material.

As previously noted, the use of dual side films on each side wall creates problems such as friction between the two plastic sheets, a higher chance of wrinkling, the added requirements of maintaining and operating a more complex system, increased material costs, increased waste, and a tendency for increased slab damage.

Figure 2:
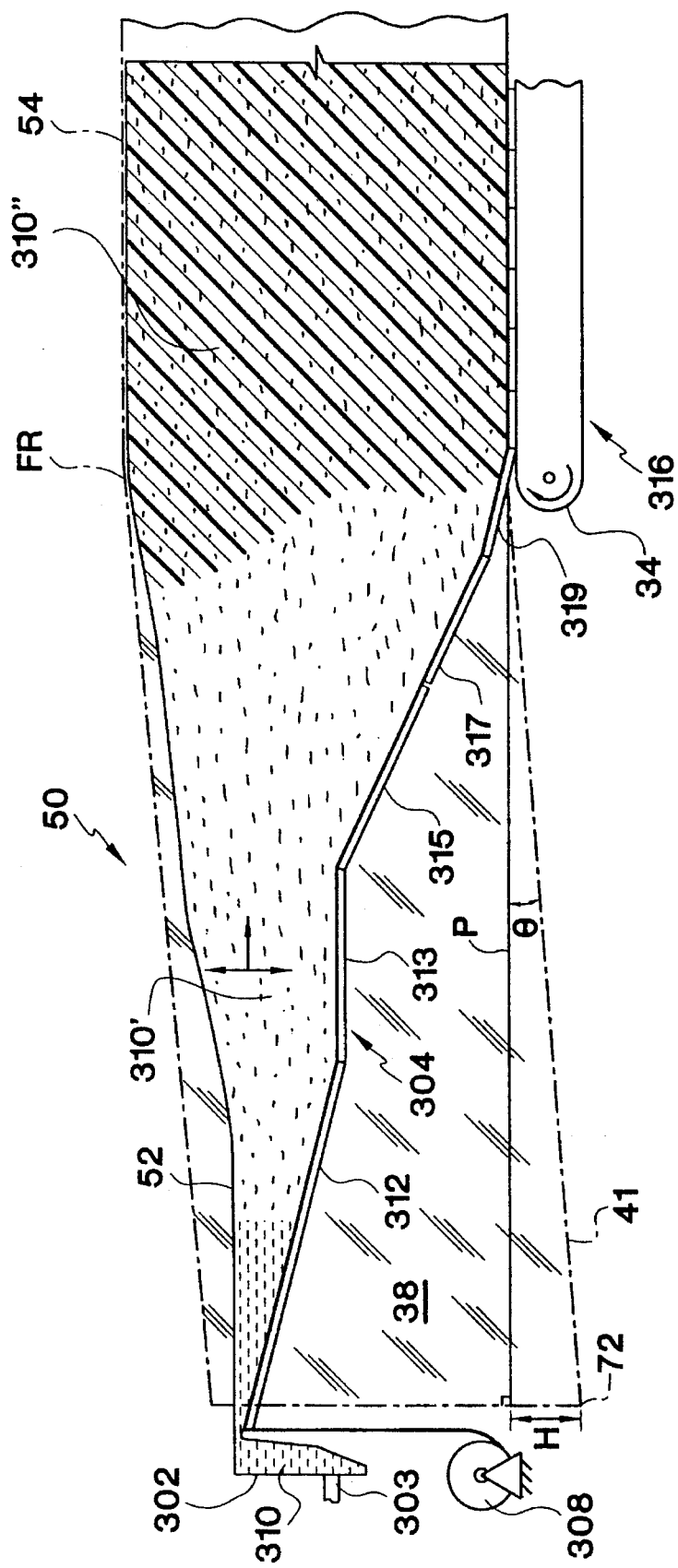
FIG. 2 shows a partially cutaway and somewhat schematic side elevational view of the foam slabstock production assembly of the present invention (the sides of the main trough being removed to facilitate the description)

FIG. 2 illustrates a schematic illustration of the side film arrangement in a preferred embodiment of the present invention. FIG. 2 shows a foam slabstock production assembly 50 with foam material 310 having been introduced into the assembly. As represented by the arrows in FIG. 2, the foam material 310' expands in an upward and downward vertical direction as it travels downstream down fall plates 312, 313, 315, 317 and 319. The expanding foam material 310' thus forms an upwardly sloping upper surface 52 which eventually turns into an essentially horizonal surface 54 upon reaching full rise status. The reference letters "FR" in FIG. 2 represent the initial full rise position or fully expanded height of foam materials used in the industry. Foam in or nearly in a full rise state is designated by reference number 310" in FIG. 2.

FIG. 2 also shows that the upstream conveyors originate at about the location that the foam reaches full rise status FR. The FR position is preferably made to be about 25 to 40' from the foam introduction location. The FR location and upstream location of the conveyors is also preferably near where side film 38 is diverted from an inclined orientation to a horizontal orientation. Some foams in the industry are slower in rising and therefore would not reach their full rise height until 8 to 10 or more feet further downstream from the upstream end of the conveyors. The upstream end of the conveyors is also preferably maintained commensurate (e.g., within ±5 feet) with the reorientation point of the side sheets. In view of the different rise times of the foam materials often placed in the same production assembly, the upstream end of the conveyors should be provided at a downstream location wherein even the slowest rising film has reached 75% of the full rise height, more preferably, 90%–100% of the full rise height, and even more preferably 95%–100% of the full rise height for the foam materials to be used. Some foams also reach their full rise position before the upstream end of the conveyors. The conveyors preferably originate within 10 feet and more preferably 5 feet of the initial upstream full rise position of this faster expanding foam.

Depending upon the foam material used and the fall plate positioning, the upper level of the foam may, rather than sloping upwardly, remain horizontal from its introduction point to its full rise state or even have an initial downward slope with the vertical expansion being accounted for by an increased downward slope in the fall plates.

Figure 3:
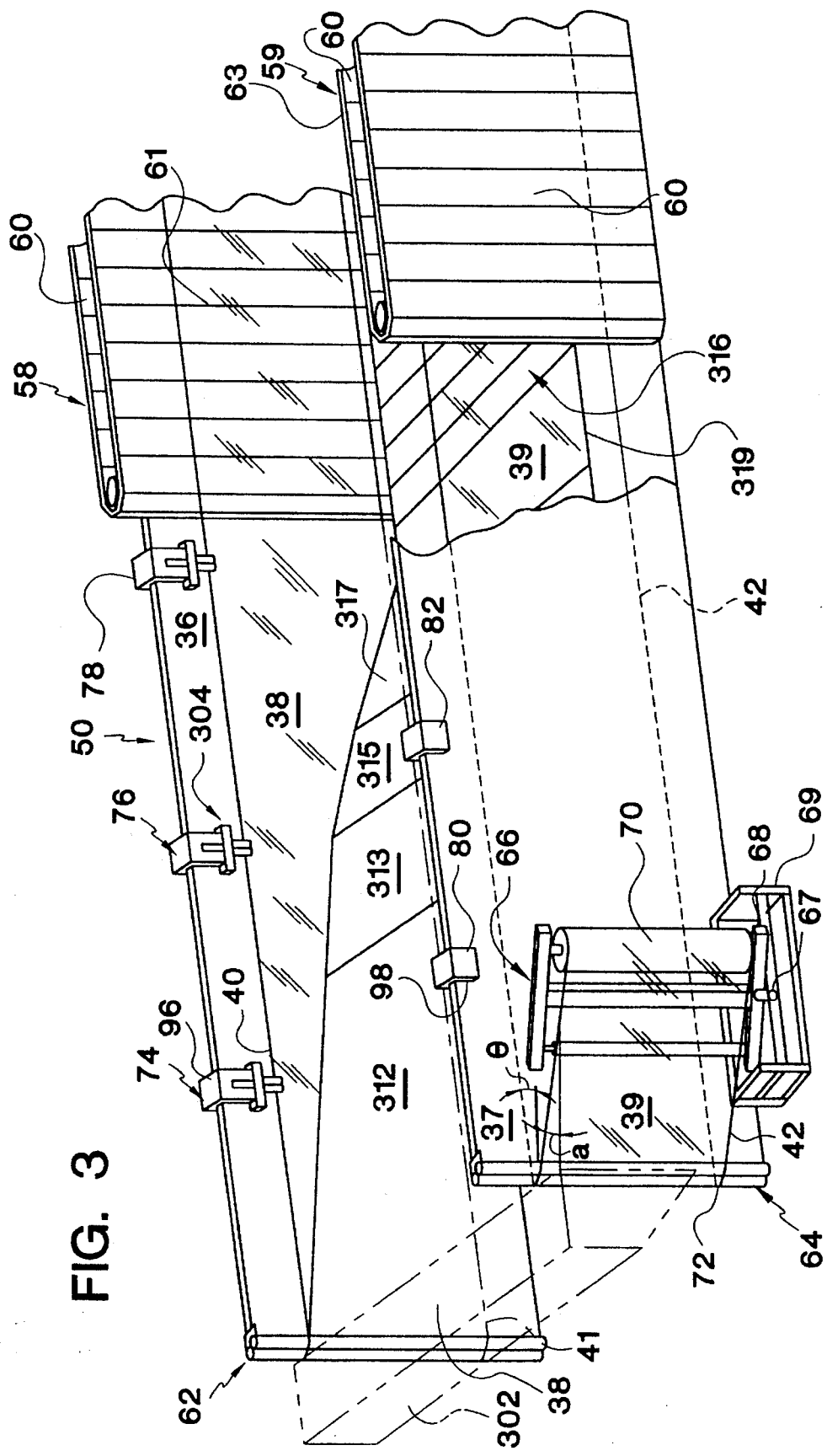
FIG. 3 shows a perspective view of a preferred embodiment of the present invention.

FIG. 3 shows a perspective view of the preferred embodiment of the invention. This embodiment of foam slabstock production assembly 50 is substantially the same as the embodiment of the invention represented schematically in FIG. 2. The foam material shown in FIG. 2 is not illustrated in FIG. 3 to facilitate discussion. Also, FIG. 3 reveals side walls 36 and 37 and side conveyors 58 and 59 which were not shown in FIG. 2. As shown in FIGS. 2 and 3, a single, upwardly sloped side sheet 38 travels between the interior surface of side wall 36 and the adjacent side edges of trough 302 and fall plates 312, 313, 315, 317 and 319. The spacing between the side wall, plates and trough is sufficient to avoid an undue amount of plate contact with the moving side film while preventing leakage of the foam material between the fall plates and side wall. If deemed desirable, the bottom sheet can be formed with a width that is greater than the width of the fall plates such that the bottom sheet's edges curve upwardly (e.g., a few inches) and contact the bottom edge of the vertically oriented side sheets.

As explained in greater detail below, the other single side sheet 39 travels in unison with single side sheet 38 along the interior side surface of the opposite side wall 37. As the side sheets' characteristics and positioning with respect to a respective side wall are the same for each sheet, the discussion below of the characteristics and relative positioning of one side sheet is equally applicable to the second side sheet.

As clearly shown in FIG. 2, the single side sheet 38 is relatively wide (e.g., 44 to 54 inches in height) and slopes upwardly in uninterrupted fashion from its first point of contact with the interior side wall 36 to a point where it is redirected so as to extend horizontally. As noted, this point is preferably commensurate with the upstream end of the moving conveyors and for many types of foam at or near the foam's full rise position. Preferably, once the side sheet reaches or nearly reaches the foam's full rise position, it is redirected so that its upper and lower edges extend essentially horizontally and/or parallel with the planar surface of bottom moving conveyor 316 (or bottom supporting surface if a bottom conveyor is not used).

Sheet 38 is shown in FIG. 2 to originate just about at the point where the foam overflows from trough 302. Other origination positions are also possible although the one illustrated is preferred. Preferably the side sheet initiates contact with the interior surface of a sidewall within the range of about 0 to 4 feet upstream or downstream from the introduction edge of trough 302 or the introduction location of the foam itself if a different foam introduction means is utilized.

The degree to which the single side sheet 38 slopes with respect to reference plane P in FIG. 2 (which is shown lying flush with the upper surface of bottom conveyor 316 or with the planar bottom of the full rise foam slab) depends on a variety of features such as the type of foam being introduced, the slope of the various fall plates (if fall plates are used), the environment immediately about the foam (e.g. humidity), the speed of downstream conveyance of the foam material, etc. The upward slope angle Θ of the side sheet is referenced in FIG. 2 with respect to the upper planar surface of the bottom conveyor which is preferably horizontal (or to the bottom planar surface of the foam body upon reaching its full rise position). For a foam slabstock production assembly embodiment like that shown in FIGS. 2 and 3, the angle Θ formed between plane P and the upwardly sloping upper or lower edge (40, 41) of the single side sheet 38 falls from an angle greater than 0° to about 15°, more preferably 4° to 8°, and even more preferably 3° to 5°.

Film bottom edge 41 is preferably positioned so as to have its lowest contact point on the interior side of side wall 36 below the reference plane P. In other words, the bottom edge 41 of side sheet 38 originates below the upper surface of bottom conveyor 316 and below a plane flush with the planar bottom surface of the foam body upon its reaching an essentially full rise position. The vertical distance between the lowest point of the side film at its contact point with the side walls and the reference plane P is preferably just greater than 0 inches (e.g., 1 or 2 inches) up to about 15 inches, more preferably, 4 to 9 inches, and, even more preferably, about 5 to 6 inches. Distance H in FIG. 2 illustrates the vertical distance between the lowest point of the side film's bottom edge at its contact point 72 with the side wall and the reference plane P. The upstream to downstream distance along a line parallel with the reference plane and extending between the aforementioned lowest contact point of the side film and the downstream point where the bottom edge is redirected from a sloped orientation to a horizontal orientation (i.e., essentially at or near the upstream end of the moving conveyors and for many foams at the full rise position of the foam material) is preferably from 15 to 40 feet, more preferably 20 to 30 feet, and even more preferably 22 to 25 feet. Preferably, the bottom and side conveyors have their upstream end positioned within 0 to 10 feet of the full rise position of the foam intended for use with the invention.

Also, the distance between the spillover edge of trough 302 (or initial foam introduction point) and either the end of fall plate 319 or the full rise position is preferably about 22 to 25 feet. If the side film is introduced commensurate with the introduction point, than the horizontal or upstream to downstream distance of the upward sloping sheet would also preferably fall within this range.

The moving conveyors preferably have a speed of about 12 ft/min to 26 ft/min, and thus the foam material also travels downstream within this range.

While a foam slab production system with adjustable fall plates, trough, side and bottom multi-plate side conveyors is shown, it should be recognized that the advantageous features of the present invention are applicable in other foamslab production designs such as for example, a system which does not rely on adjustable fall plates or an overhead foam material injection nozzle as opposed to an introduction trough, etc.

The side sheet or film that is used can be any of the sheet material used in the industry such as paper or plastic. A preferred material for side sheet 38 is a high density polyethylene plastic having a thickness of from 1 to 5 mm and a width of 44 to 54 inches. The use of lower thickness plastic film can introduce film stretching problems.

FIG. 3 shows side conveyors 58, 59 originating at the same location as bottom conveyor 316 and each side conveyor includes an inner conveyor surface 61, 63, respectively, which is essentially planar with the interior surface of the adjacent side wall. All of the conveyors preferably are formed of a plurality of rigid individual plates or slats 60 which are sufficiently small in width and hingedly connected to allow for travel of the plates around the curved ends of the conveyor driving means.

FIG. 3 further illustrates vertical roller guide sets 62 and 64 rotatably supported at the upstream end of side walls 36 and 37, respectively. Vertical roller guide sets 62 and 64 help side films 38 and 39 make a smooth transition from their point of origination to the interior surface of the side wall. Various other means may also be utilized such as a smoothly contoured edge at the upstream end of the side wall or the downstream surface of a vertical slot formed in the side wall.

Figure 4:
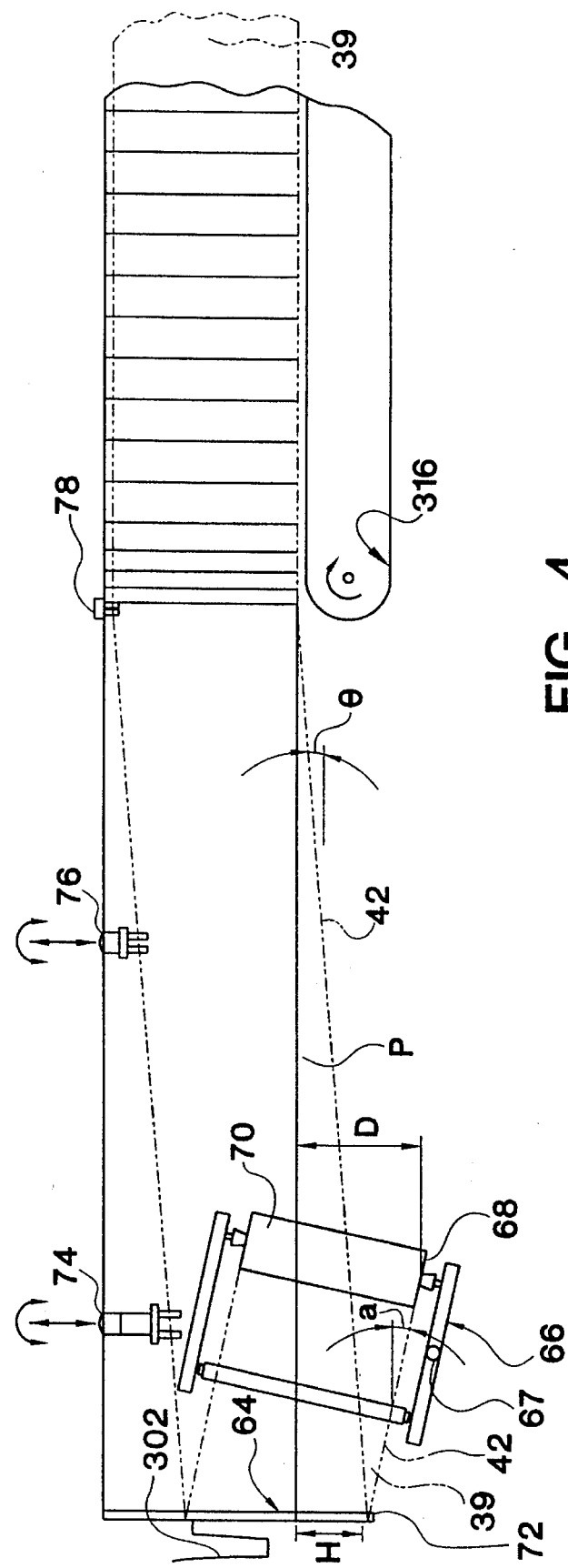
FIG. 4 shows a schematic side elevational view of the embodiment of the present invention shown in FIG. 3.

FIGS. 3 and 4 show one preferred manner of feeding a side sheet to a starting position on the interior surface of a side wall. As shown in FIGS. 3 and 4, a first side film unwind assembly 66 or side film feed means is positioned to the exterior of side wall 37 and downstream from guiding roller set 64. As described in greater detail below, unwind assembly 66 is pivotably supported about pivot 67 which in turn is supported by frame structure 69.

In a preferred arrangement, side film unwind assembly 66 is fixed into a desired position so that lower end 68 of supply roll 70 is below the point of contact 72 of the lower edge 42 of sheet 39 with the upstream end of side wall 37. This contact point 72 is shown in FIG. 3 to be on vertical roller set 64. The lower end 68 of supply roll 70 can be positioned even further below contact point 72 upon a tilting of unwind assembly in a clockwise direction (as shown in FIG. 3). A tilting range for unwind assembly 66 is 0° to 15° either clockwise or counter-clockwise or, more preferably, 0° to 10°. The lower end 68 of supply roll 70 is preferably positioned about 0 to 15 inches below reference plane P when the unwind assembly is in a neutral state. The distance that the lower edge 68 of roll 70 is below reference plane P is indicated by distance "D" in FIG. 4. When the unwind assembly is tilted downstream as in FIGS. 3 and 4, its lower edge is placed even further below reference plane P and the distance D is increased over the distance D for a neutrally positioned unwind assembly. D is thus larger than distance H (FIG. 2) whenever the unwind assembly is tilted down. Typically, distance H is half of distance D whenever the unwind assembly is tilted down to increase D. Distance D is preferably about 6 to 12 inches greater than distance H. Pivot point 67 is also preferably positioned downstream of vertical roller sets a distance of 0 to 4 feet. The distance of a line extending from the pivot point 67 to a transverse intersection of the central axis of the supply roll is about 8" to 20" or more preferably 10" to 16".

Figure 5:
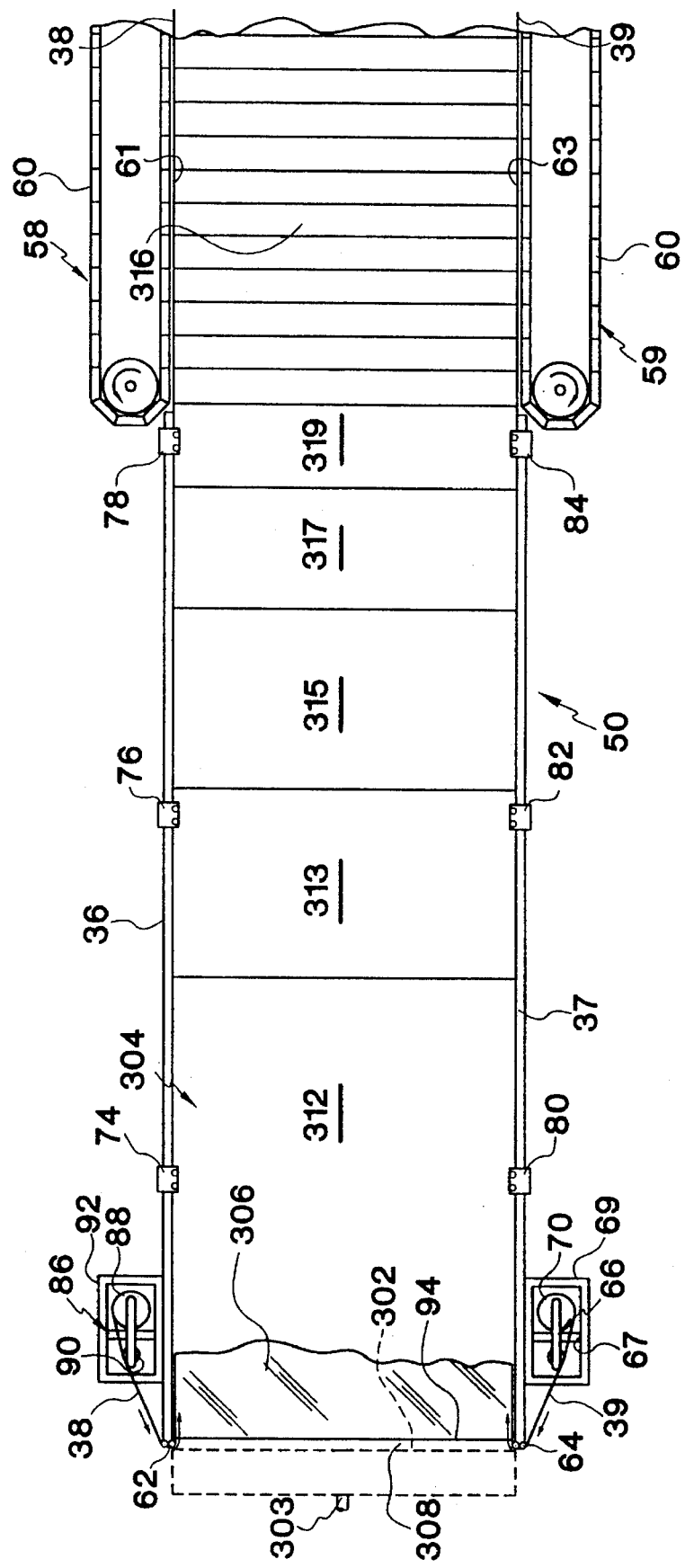
FIG. 5 shows a top plan view of that which is shown in FIG. 3.

FIG. 5 provides a planar view of production assembly 50 shown in perspective in FIG. 3. As illustrated in FIG. 5, second unwind assembly 86 is positioned with respect to side wall 36 in a manner similar to the way unwind assembly 66 is positioned with respect to side wall 37. In this way, like its opposite wall counterpart, single side sheet 38 extends from roll 88 in unwind assembly 86, about idler roller 90, is wrapped about guide roller set 62 and placed into contact with the interior surface of side wall 36. Support frame 92 provides the necessary support to the roll support structure. Side sheets 38 and 39 travel with the foam body and can either be left on the foam body while the foam body is at a storage/cooling location or stripped off at the downstream edge of the moving side conveyors (onto a takeup waste roller (not shown)).

The top plan view of FIG. 5 also illustrates the passage of bottom film 306 (shown in cutaway) through a slot provided near the upstream edge of plate 312 and the overlapping downstream edge 94 of inlet trough 302. As shown in FIGS.

2 and 5, bottom film 306 originates from roll 308 and is threaded through the slot and travels downstream with the foam material. Trough 302 is hingedly connected to the upstream end of fall plate 312 and preferably is vertically adjustable with suitable adjustment means (not shown). The highest end of plate 312 is preferably placed vertically above plane P a distance of 20" to 45".

FIG. 5 also illustrates suitable positioning for roller sets 74, 76, 78 and 80, 82, 84. These roller sets are longitudinally fixed in position, although the present invention also contemplates the use of longitudinally adjustable roller sets.

Figure 9:
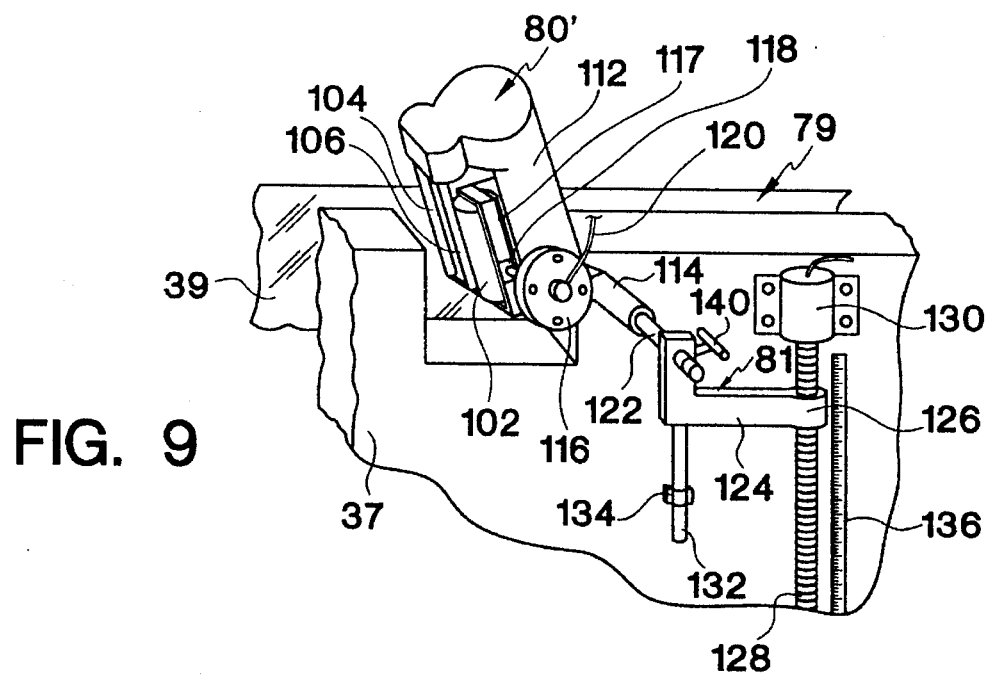
FIG. 9 illustrates an adjustable side film roller set assembly mounted on a side wall.

FIG. 9 illustrates an alternate embodiment (80') of roller set 80 generally depicted in FIG. 5. As shown in FIG. 9, side wall 37 has a cutout formed therein which receives roller set assembly 79 which includes roller set 80'and adjustment assembly 81. Roller set 80' is positioned in the side wall cutout such that the side film angle maintenance rollers are properly positioned (only maintenance roller 102 being visible in FIG. 9). The adjacent maintenance roller not shown in FIG. 9 is positioned next to roller 102 so as to pinch film 39 therebetween and to retain it at the desired orientation as the film is pulled by the conveyors downstream together with the foam. This pinching action is assisted by pushing assembly 116 which is air driven and acts to push outwardly on U-shaped bracket 117 so as to cause roller 102 to press into the adjacent roller and pinch the film therebetween. Line 120 represents a suitable air line.

Figure 10:
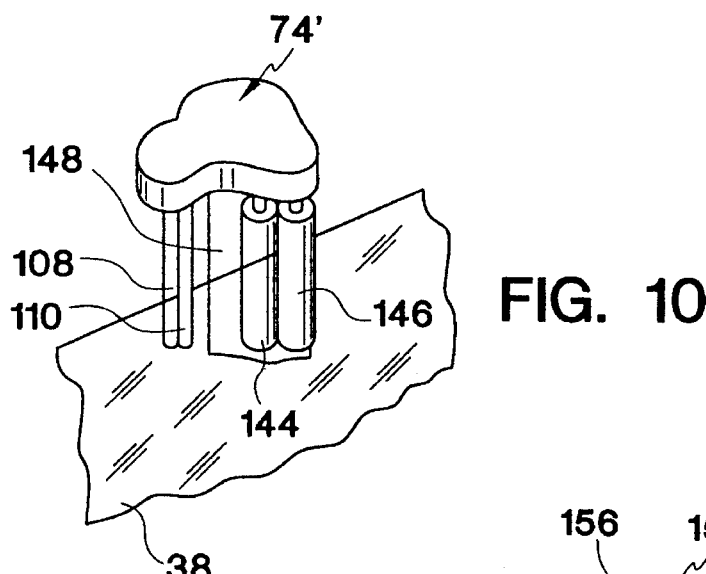
FIG. 10 shows a roller set corresponding to that in FIG. 9 except on an opposite side wall.

FIG. 10 shows roller set 74' which is preferably positioned on the upstream end of opposite wall 36. Sets 74' and 80' also feature additional film threading rollers (or smooth, fixed cylinders) 104, 106 and 108, 110, respectively.

The maintenance rollers in upstream roller set 80' are supported by housing 112 which includes suitable bearings (not shown) for roller rotation.

Shaft 122 extends from housing extension 114 and through arm 124. Arm 124 includes head 126 with internal threads to threadably receive threaded shaft 128. Motor 130 is provided to rotate shaft 128 so as to adjust head 126 along shaft 128. Rod 132 is rigidly attached to arm 124 and slidably received in U-shaped bracket 134 which prevents rotation of arm 124 out away from or toward side wall 37 as it is vertically adjusted. Head 126 is provided with a suitable marker for positioning head 126 at a desired point along gauge 136 which is calibrated to provide corresponding desired positions for the rollers in roller set 80'.

Pivotable adjustment of roller set 80' is achieved by loosening stop member 140, rotating shaft 122 and then relocking shaft 122 when the desired position is reached. If desired, a rotation angle gauge can also be provided for more precise angle positioning. Also, shaft 122 is slidable in the hole formed in arm 124 so that side to side adjustments can be made in roller set 80'.

FIG. 10 shows the most upstream roller set 74' which opposes roller set 80' and which has at its housing supported by a similar assembly as that shown in FIG. 9, only exterior to opposite wall 36. In FIG. 10 both rollers 144 and 146 are illustrated and shown in a pinching and angle maintenance relationship with side film 38.

Figure 11:
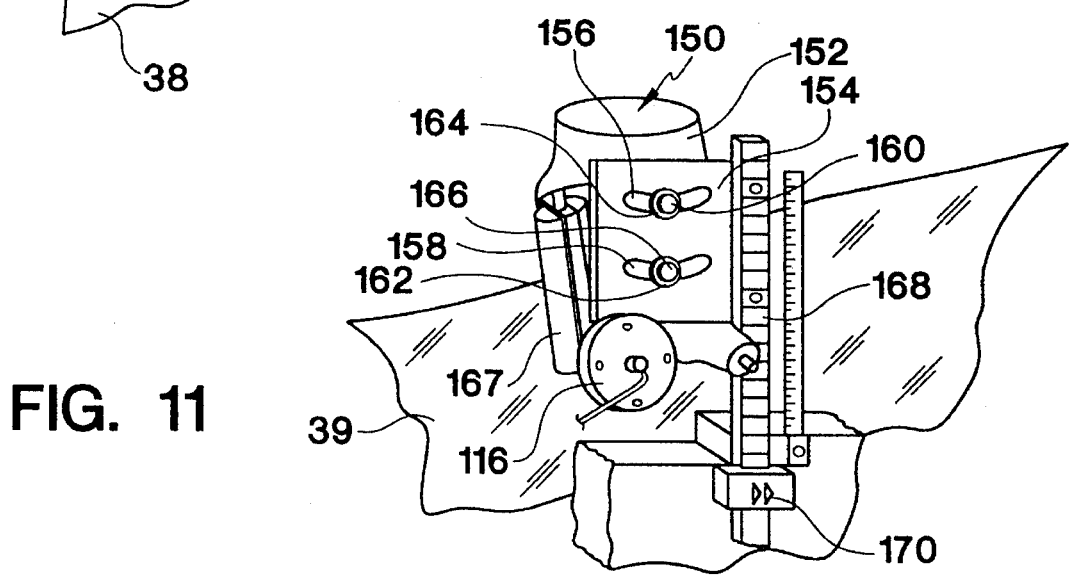
FIG. 11 shows another embodiment of a roller set.

FIG. 11 shows an alternate embodiment 150 of a roller set which preferably is positioned where roller sets 76, 78, 82 and 84 are positioned on side walls 36 and 37. Roller sets 150 are preferably used in combination with roller sets such as 74' and 80' shown in FIGS. 9 and 10 with four roller sets 150 positioned in the further downstream locations shown in FIG. 5.

The roller set 150 shown in FIG. 11 is similar to roller set 80' in FIG. 9 except that housing 152 is rigidly secured to angling plate 154. Angling plate 154 includes two curved slots 156, 158. Studs 160 and 162 extend through slots 156 and 158 and threadably receive washer and nut combinations 164 and 166 such that the rollers (one designated by reference number 167) can be angled to a desired degree and then fixed in position by fastening down the nuts received by studs 160 and 162. Vertical positioning is also preferably achieved by raising and lowering rack 168 and locking rack in place with pawl assembly 170 which slidingly receives rack 168. Positioning gauge 172 can be provided adjacent the rack with suitable marking indicia or directly adjacent the rollers. Again, roller set 150 has its housing 152 received in a side wall cut out such that the rollers are in direct alignment with the film.

Roller sets 74, 76 and 78 are preferably spaced within a range of 20 to 30%, 40 to 50% and 70 to 80%, respectively, of the total horizontal distance between the foam introduction location and the upstream end of the moving conveyors. The opposite side roller sets would be correspondingly positioned along side wall 37. Thus, for a horizontal distance of 25 feet, the most upstream roller set would be within 5 to 7.5 feet of the foam introduction location, the intermediate set 10 to 12.5 feet, and the most downstream set 17.5 to 20 feet. The most downstream roller sets in conjunction with the pulling force of the pulling force of the downstream conveyors function to deflect the side sheets so as to extend horizontal or parallel with the reference plane. The deflecting rollers are preferably positioned so as to deflect the sheets within ±8 feet or, more preferably ±5 feet of the upstream end of the conveyors which is preferably also the initial full rise position of the foam material supported by the supporting and confining assembly.

The roller sets described above (or alternative means for maintaining a desired side film orientation) can also be positioned so as to achieve a variety of angle orientations in each side sheet while the sheet passes between the initial contact point with the interior of the side wall and near or at the downstream end of the side wall or the upstream end of the side conveyors.

Preferably, the side film has an initial incline at the upstream contact point 72 which is between 1° to 15°. Upon reaching the first roller set, the side film can be slightly redirected so as to better conform with the nature of the foam material and the other variables such as fall plate positioning and location of the roller set along the side wall. If the side film is redirected, it is typically only redirected by a maximum of 10° so as to avoid wrinkling. The slope of the side film upon reaching the first roller set can either be maintained the same, increased or decreased (e.g., 2° or 3°) so as to better conform with the manner in which the foam is expanding. In other words, if the foam is of the type wherein it has a high initial expansion rate, then the slope of the film between the initial contact point and the first roller set and perhaps even the slope between the first and second roller sets can be increased. Thereafter, the slope would approach the horizontal as the foam is of the type which nearly completes full expansion early on its downstream travel. On the other hand, if the foam does not have a high initial expansion rate, then a relatively small slope during the initial stage of film travel might be suitable while an increase in slope is provided to account for the later expansion. An angle range of 0° to 15° is preferred for both the section between the first and second roller sets and the section between the second and third roller sets. The 0° end of the range reflects the fact that the film might be made horizontal for some types of foam which have a very high initial expansion rate. After passing the third set of rollers, the side film conforms with the conveyor orientation which preferably is horizontal.

In one embodiment of the invention, the film has a 9° angle extending off from the initial contact point, the film is then redirected at the first roller set so as to have an 11° angle while extending between the first and second roller sets. Upon reaching the second roller set it is provided with a 3° angle until it reaches the third roller set where it is directed horizontally 0°. The above example is but one of many possible arrangements since the first section of film travel generally ranges from 1° to 15°, the second section 0° to 15° and the remaining section 0° to 15°. For instance, a foam which takes longer to reach the full rise position might start out at 8°, have a 9° second section and then a 6° third section prior to being redirected horizontally. The above noted angles are determined based on a line parallel to the reference plane.

Figure 8:
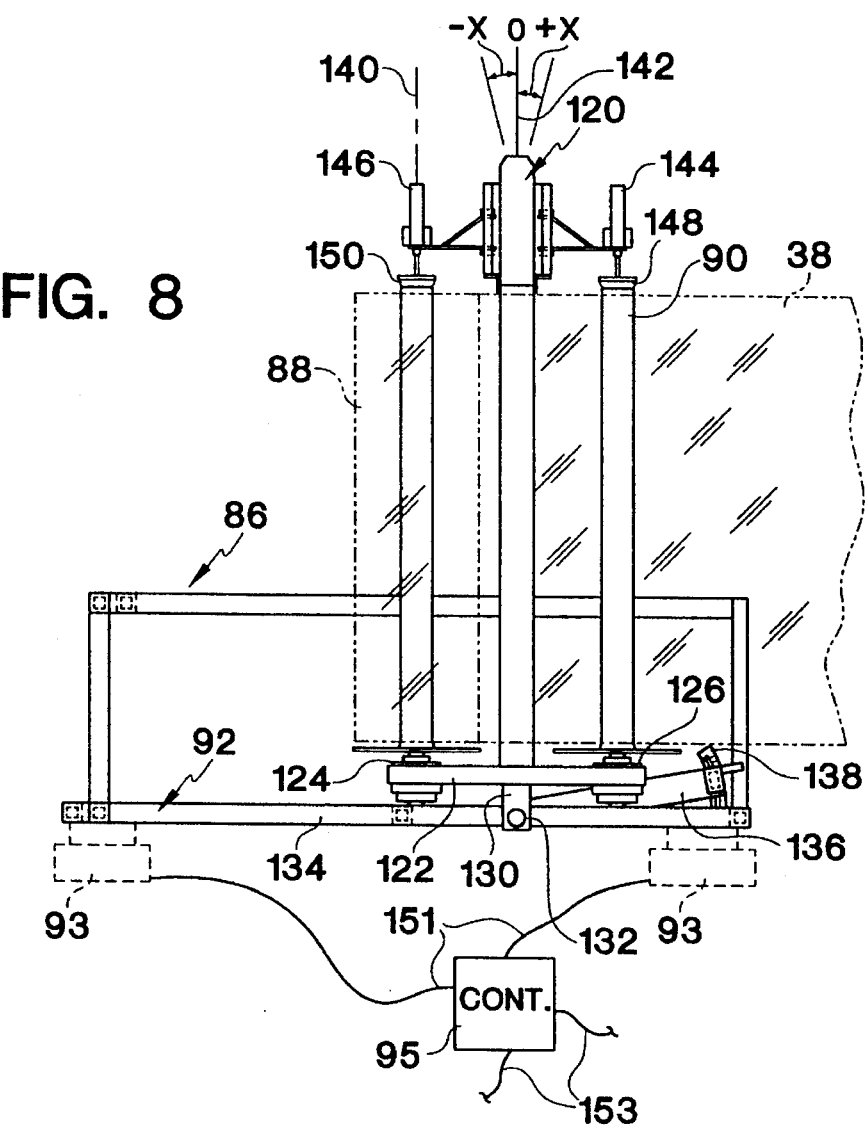
FIG. 8 shows a front elevational view of a frame structure and roll support structure forming part of the side film unwind assembly.

FIG. 8 shows an elevational side view of a preferred embodiment of side film unwind assembly 86. Side film unwind assembly 66, which is on the opposite side wall, would have a similar arrangement. Unwind assembly 86 includes rigid frame structure 92 which supports roll support structure 120 and provides a protective casing about the rotating roll 128 (shown in dashed lines.) Roll support structure 120 includes bottom platform 122 whose extremities support bearing assemblies 124 and 126. Bottom platform 122 is secured to the bottom of central shaft 130 which is rigidly secured to pivot shaft 132 which, in turn, is rotatably supported by an appropriate bearing support (not shown) integral with lower beam 134 of rigid frame structure 92 (only a cross-sectional view of frame structure 92 is shown with the portion shown being that most closely positioned to the exterior of sidewall 36). The central axis of the bearing assemblies is preferably positioned about 8 to 20" or more preferably 10 to 16" from the center of bottom platform 122.

Rigidly fixed to pivot shaft 132 or the bottom of central shaft 130 is tilt adjustment bar 136 whose free end slides along adjacent slide bar 138. Slide bar 138 includes angle notations which enable an operator to adjust the tilt of the central axis 142 to a predetermined setting. Slide bar 138 includes a slot to enable a screw fastener to lock bar 136 into the desired position.

FIG. 8 shows the central shaft axis 142 parallel with central axis 140 of the roller and the +X and −X dashed angle designations illustrate the range of tilt for axes 140 and 142. The preferred range of tilt for axis 142 is ±15° from the neutral position which is defined as the transverse intersection of axis 142 with reference plane P.

Central shaft 130 includes at its upper end mounts 144 and 146 with holders 148 and 150. Holders 148 and 150 can be hydraulically or spring biased in mounts 144 and 146 to enable easy release and securement of film supply rolls and idler roll 90.

Vertical adjustment can be achieved by having central shaft 130 formed of telescoping components which can be contracted and expanded by any known means in the art such as, for example, hydraulics or a motorized or manually threaded engagement between the telescoping elements. The central shafts of the unwind assemblies can be connected to a common control which can manipulate fluid entry into the telescoping shaft or control the rotation of a motor to ensure equal vertical positioning of the bottom of the two supply rolls.

Instead of adjusting a telescoping central shaft, it is also possible to provide hydraulic or motored mounts below the frame structures 69 and 92.

The alternative frame structure mounts 93 are shown in FIG. 8 with dashed lines. Central control 95 can be used to provide for controlled positioning of the mounts below each frame structure. The use of two mounts at the longitudinal ends of each frame structure can also be used to achieve a predetermined tilt. Control lines 151 (lines 153 shown cut off in FIG. 8) extend to similar mounts 93 positioned under opposite ends of frame structure 92. Control lines 153 extend to similar mounts (not shown) under frame 69. In this latter arrangement the manual tilt adjustment bar would not be required and the roll support can be fixedly attached to the frame structure.

In the method of the present invention, the fall plates, maintenance roller sets, film roll supports and unwind assemblies are positioned and angled in positions which provide a bun with an improved flat top while avoiding defects such as side splits. Once the unwind assembly, roller sets, and fall plates are appropriately positioned, the rollers and side and bottom conveyors can be turned on so that the side film and bottom film begin to travel downstream within the supporting and confining assembly. Foam is then introduced either through use of an introduction trough or overhead nozzle or any other suitable means. The single side film of each unwind assembly extends about the side wall contact point and is redirected at angle θ upwardly between the rising foam and the rigid side wall. The side film is then redirected so as to have substantially horizontal edges near where the foam reaches the FR position which is also the preferred starting point for the bottom and side conveyors. After passage along the bottom and side conveyors, the foam bun can be removed and placed in an appropriate storage cooling location while the side films are taken up on waste rollers and the bottom film remains on the bun.

The unwind assemblies can be appropriately tilted such that the film first slopes upwardly into its contact position with the upstream end of the rigid side wall. This angle is represented by α in FIG. 4 and is between 0° to 15°. Although each roller set is shown to be individually adjustable as well as each unwind assembly, it is also possible to have corresponding roller sets and unwind assemblies in either mechanical, fluid or electrical connection such that changes on one side of the sidewall occur equally at the opposite side wall so as to treat each side of the foam bun equally.

Figure 6:
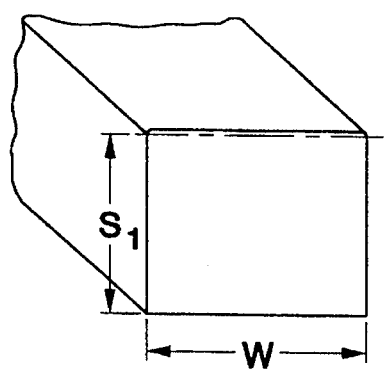
FIG. 6 shows a foam slab produced in accordance with the present invention.
Figure 7:
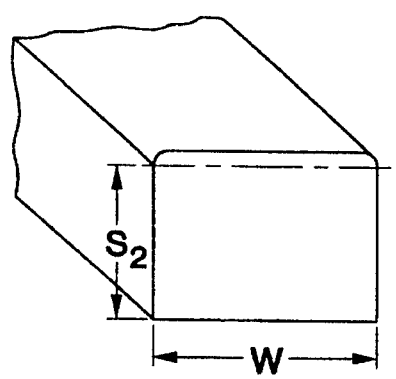
FIG. 7 shows a foam slab produced in accordance with the system of FIG. 1.

FIGS. 6 and 7 provide a comparison of the resultant product prepared under the prior methods of foam bun production (FIG. 7) and the production method of the present invention (FIG. 6). In FIGS. 6 and 7 the width of a foam bun is designated by W while the height of the sides of the foam bun are designated by S1 and S2. The width of a foam bun is typically about 50 to 100 inches. The height of a foam bun produced in methods such as that shown in FIG. 1 is often about 44 or 55 inches (side edges) shown by dimension line S2. The height of S1 produced in accordance with the present invention is greater than that of S2. While the difference between S1 and S2 might be only 2 to 3 inches, when considering that the longitudinal lengths of a foam bun is typically about 50 feet long and a large amount of foam slabs are typically produced daily, this increase can make for a significant advantage in the industry. Furthermore, the system provides a manner for producing high side edge buns without side edge defects.

Although the present invention has been described with reference to the preferred embodiments, the invention is not limited to the details thereof. Various substitutions and modifications will occur to those of ordinary skill in the art and also substitutions and modifications are intended to fall within the spirit and scope of the invention as defined in the appended claims.

What is claimed is:

1. A foam slab production assembly, comprising:

a supporting and confining assembly having a bottom supporting surface and two side walls;

means for introducing foam material onto the bottom supporting surface of said supporting and confining assembly;

a first and a second side film introduction assembly each dimensioned and arranged for introducing a single side sheet into contact with a respective one of said side walls such that each side sheet has a first side which contacts the respective one of the side walls while the side wall is stationary and a second side that initiates contact with the foam material while in an early stage of a violent state of expansion and while the foam material and side sheets travel downstream with respect to the stationary side walls, and such that each single side sheet is inclined upwardly with respect to a reference plane lying flush on a portion of the bottom supporting surface above which introduced foam material is in an essentially full rise state, and such that a bottom edge of each side sheet has a section lying below the reference plane.

2. A production assembly as recited in claim 1 wherein only a single side sheet is positioned between the foam material while in an expanding state and an adjacent, stationary side wall and said side walls being dimensioned such that the side sheets initiate contact with the foam within 0 to 4 feet, upstream and downstream, of an initial foam contact location with said bottom supporting surface.

3. A production assembly as recited in claim 2 wherein a lowestmost point of said bottom edge section for each sheet is positioned greater than 0 and up to 15 inches below the reference plane and wherein each of said sheets is at least initially upwardly sloped at an angle greater than 0° and up to about 15°.

4. A production assembly in claim 1 wherein a lowest most point of said bottom edge section for each sheet is positioned greater than 0 and up to 15 inches below the reference plane and each of said sheets is at least initially upwardly sloped at an angle of greater than 0° and up to about 15°.

5. A production assembly as recited in claim 1 wherein each of said sheets has a bottom edge that is 4 to 9 inches below the reference plane.

6. A production assembly as recited in claim 1 wherein each of said sheets is upwardly sloped 4° to 8°.

7. A production assembly as recited in claim 1 wherein the bottom support surface of said supporting and confining assembly includes a stationary section and a bottom conveyor with the bottom conveyor extending from a downstream end of said stationary section, said supporting and confining assembly further including a pair of moving side conveyors extending further downstream from the downstream end of said side walls, and said reference plane lying flush on an upper surface of said bottom conveyor.

8. A production assembly as recited in claim 7 wherein each of said conveyors originate at about 15 to 30 feet downstream of an initial introduction of the foam material by said foam introduction means onto the bottom supporting surface and wherein said conveyors originate at a location on the supporting and confining assembly which is within 0 to 10 feet of an initial essentially full rise position of the foam material and said bottom conveyor and reference plane are horizontal.

9. A production assembly as recited in claim 1 wherein said bottom support surface includes downwardly inclined plates followed by a horizontally extending bottom supporting surface section, and said reference plane is horizontal.

10. A production assembly as recited in claim 1 further comprising maintenance means for maintaining a predetermined upward slope in the side film while in contact with the stationary side walls.

11. A production assembly as recited in claim 10 wherein said maintenance means includes deflection means positioned so as to facilitate a redirecting of the upwardly inclined side film to a direction which is parallel to the reference plane.

12. A production assembly as recited in claim 11 wherein said maintenance means includes roller sets spaced along each of said side walls with a pair of downstream roller sets providing the deflection means for facilitating side film redirection.

13. A production assembly as recited in claim 12 wherein said roller sets are non-powered roller sets with at least some of said roller sets being angularly and vertically adjustable in position.

14. A production assembly as recited in claim 1 wherein each of said side film introduction assemblies includes an unwind assembly positioned externally and downstream of an upstream end of a respective one of said side walls such that the side film first travels upstream, contacts said sidewall at a side wall contact location and then is directed along the interior surface of a respective side wall.

15. A production assembly as recited in claim 14 wherein said unwind assembly includes a side film roll support upon which a side film roll is rotatably mountable, and said side film roll support being positionable into a position that places a lower edge of the side film roll below the bottom edge of the film while at the side wall contact location such that the side film slopes upwardly prior to first contacting one of said side walls.

16. A production assembly as recited in claim 15 wherein said unwind assembly is dimensioned and arranged such that the side film roll support is tiltable.

17. A production assembly as recited in claim 16 wherein said roll support is tiltable in a downstream direction from 0° to 15°.

18. A production assembly as recited in claim 17 wherein said unwind assembly is vertically adjustable.

19. A production assembly as recited in claim 15 wherein said unwind assembly is vertically adjustable.

20. A production assembly as recited in claim 1 wherein said supporting and confining assembly includes a bottom conveyor and a plurality of adjustable fall plates, said bottom conveyor originating at a downstream end of said fall plates, said supporting and confining assembly further including side conveyors originating at a downstream end of said side walls, and wherein only a single sheet is positioned between the introduced foam material while in an expanding state and an adjacent, stationary side wall.

21. A production assembly as recited in claim 20 wherein said side and bottom conveyors drive the foam material and bottom and side sheets downstream at a rate of 12 feet/min. to 26 feet/min.

22. A production assembly as recited in claim 1 further comprising maintenance means for maintaining a predetermined upward slope in the side film while in contact with the stationary side walls, said maintenance means being dimensioned and arranged such that said side film has sections positioned at different angles while passing along said side wall.

23. A production assembly as recited in claim 22 wherein said maintenance means includes adjustable roller sets and said roller sets being positioned and arranged such that there are at least three different sections along each side wall between the roller sets and an initial film contact point with a first upstream section having an angle from 1° to 15°, a second intermediate section 0° to 15° and a third downstream section an angle from 0° to 15°.

24. A foam slab production assembly comprising:
   a supporting and confining assembly having a bottom supporting surface and two side walls;
   means for introducing foam material onto the bottom supporting surface of said supporting and confining assembly;
   means for introducing a side sheet between a respective one of said side walls while in a stationary state and the introduced foam material such that only a single side sheet is positioned between and contacts the introduced foam material and the respective side wall and such that the single sheet slopes upwardly from a contact location with said side wall and has a bottom edge which lies below a reference plane lying flush on a section of the bottom supporting surface which lies below the foam after the foam has reached at least 75% of full rise height, and wherein said supporting and confining assembly includes bottom and side conveyors positioned downstream of the stationary side walls and said bottom and side conveyors being dimensioned and arranged so as to draw the foam material and side and bottom sheets contacting the foam material downstream while said side sheets slide downstream with respect to the stationary side walls.

25. A production assembly as recited in claim 24 wherein said bottom supporting surface includes at least one bottom plate and the bottom conveyor extending downstream from a downstream end of said bottom plate and said reference plane lying flush on an upstream end section of said bottom conveyer, and said side walls being dimensioned such that said side sheets initiate contact with the foam within 0 to 4 feet, upstream and downstream, of the initial foam material contact with said bottom supporting surface.

26. A production assembly as recited in claim 24 wherein said means for introducing side film includes two side film feed means which each support a supply of side film exterior to said side walls and downstream of an upstream end of said side walls such that the film is first directed upstream and then wrapped about an upstream edge of said side walls and then redirected along an interior surface of said side walls.

27. A production assembly as recited in claim 26 wherein said side film feed means feeds the film at an upward slope as the film travels towards initial contact with said side walls.

28. A production assembly as recited in claim 27 wherein said side film feed means includes a tiltable side film roll support assembly.

29. A production assembly as recited in claim 28 wherein said side film roll support assembly is vertically adjustable.

30. A production assembly as recited in claim 24 further comprising side film angle maintenance means for maintaining a predetermined slope in said side sheets as said side sheets slide along said stationary side walls.

31. A production assembly as recited in claim 30 wherein said maintenance means positions said side film so as to provide a plurality of sections which are at different slopes.

32. A production assembly as recited in claim 24 wherein said bottom supporting surface includes a stationary plate and a bottom moving conveyor which is horizontal and extends downstream from said plate, and said supporting and confining assembly including side conveyors extending downstream from said stationary side walls, and said bottom and side conveyors originating at a location wherein the foam material has reached about 90% of a full rise height.

33. A foam slab production assembly comprising:
   a supporting and confining assembly having a bottom supporting surface and two side walls, said bottom supporting surface comprising a bottom plate and a bottom conveyor with the conveyor extending horizontally off of a downstream end of said bottom plate;
   means for introducing foam material onto the bottom supporting surface of said supporting and confining assembly;
   side film introduction means for introducing a single side sheet into contact with an interior surface of a respective one of each of said side walls such that each side sheet has a first side which contacts the interior surface of a respective one of said side walls, while the side walls are stationary, and a second side which is adapted to initiate contact with the foam material while in an early stage of a violent state of expansion and while the foam material and side sheets travel downstream with respect to the stationary side walls, and such that each single side sheet is inclined upwardly with respect to a horizontal reference plane lying flush on the horizontal bottom conveyor, and such that each single side sheet, while adjacent the interior surface of a respective side wall, has a section which slopes upwardly from below the reference plane, intersects the reference plane and slopes upwardly along the respective adjacent interior surface, and said single sheet being the only material positioned between the foam, while expanding, and the interior surface of said side walls.

34. A foam slab production assembly, comprising:
   a supporting and confining assembly having a bottom supporting surface and two side walls;
   a foam material introduction assembly which introduces foam material onto the bottom supporting surface of said supporting and confining assembly;
   a first and a second side film introduction assembly each dimensioned and arranged for introducing a single side sheet into contact with a respective one of said side walls such that each side sheet has a first side which contacts the respective one of the side walls while the side walls are stationary and a second side that contacts foam material during an initial stage of foam expansion which initiates prior to a 75% full expansion state of the foam material and while the foam material and side sheets travel downstream with respect to the stationary side walls, and such that each single side sheet is inclined upwardly with respect to a reference plane lying flush on a portion of the bottom supporting surface above which introduced foam material is in an essentially full rise state, and such that a bottom edge of each side sheet has a section lying below the reference plane, and wherein only said side sheets are positioned between the foam while in an expanding state and the respective side walls;
   a bottom sheet introduction assembly for introducing a bottom sheet between said bottom supporting surface and the foam material;
   a first and second side conveyor assembly extending downstream from a respective downstream end of said first and second side walls and having an interior surface that is aligned with an interior surface of a corresponding side wall, and said first and second conveyors having an upstream end which is positioned for contact with the foam material at or after reaching the 75% full expansion state;

a bottom conveyor assembly forming an extension of said bottom supporting surface and having an upstream end for contact with the foam material at or after the 75% full expansion state;

said first and second side film introduction assemblies being positioned between an upstream and a downstream end of said side walls and external thereto, and said foam slab production assembly including initial upstream contact surfaces positioned at an upstream end of a respective one of said side walls and about which said side sheets wrap in converting from an upstream direction to a downstream direction, and said initial upstream contact surfaces being arranged essentially transversely with respect to the reference plane, and said first and second side film introduction assemblies being positioned such that the bottom edge of said side sheets slopes upwardly between said side film introduction assemblies and said initial upstream contact surfaces and then slopes further upwardly along the interior of said side walls; and a plurality of non-powered side sheet angle maintenance rollers spaced in series along said respective side walls.

35. A production assembly as recited in claim 14 wherein said side wall contact location is transverse with respect to the reference plane and said film introduction assembly being positioned such that the bottom edge of said side sheets slopes upwardly prior to contacting said side wall contact location and then further slopes upwardly along the interior surface of a respective side wall.

36. A production assembly as recited in claim 1 wherein said bottom supporting surface includes a series of inclined fall plates extending between said side walls and a bottom conveyor assembly extending downstream from a downstream end of said series of fall plates, and said supporting and confining assembly including a first and a second side conveyor assembly extending downstream from a downstream end of said side walls, and said side conveyors having an interior surface lying on a common plane with an interior of said side walls.

* * * * *